United States Patent Office 3,590,043
Patented June 29, 1971

1

3,590,043
CONDENSED ISOINDOLONE DERIVATIVES
Wilfried Graf, 63 Schweissbergweg, Binningen,
Basel-Land, Switzerland
No Drawing. Continuation-in-part of application Ser. No.
578,494, Sept. 12, 1966. This application Oct. 30, 1968,
Ser. No. 771,972
Claims priority, application Switzerland, Sept. 21, 1965,
13,013/65; Sept. 21, 1966, 13,633/66
Int. Cl. C07d 57/02, 57/14
U.S. Cl. 260—250.4
8 Claims

ABSTRACT OF THE DISCLOSURE

Substituted tetrahydro-imidazo-, tetrahydro-pyridazo- and hexahydro-diazepino-isoindolone derivatives having an amino-alkanoyl group in 1-position are prepared by amination of the corresponding compounds having a halogeno-alkanoyl group in 1-position; also embraced are pharmaceutically acceptable acid addition salts, quaternary salts and the N-oxides; these compounds have anti-inflammatory, spasmolytic and antitussive activities; they are the active ingredients of pharmaceutical compositions and can be used for the treatment of inflamamtory diseases, spasms and tussive irritations; an illustrative embodiment is 1-(N-propyl-N-benzylglycyl)-9b-phenyl-1,2,3, 9b-tetrahydro-5H-imidazo[2,1-a]isoindol-5-one.

CROSS REFERENCE TO RELATED APPLICATIONS

This application is a continuation-in-part of copending patent application Ser. No. 578,494, filed September 12, 1966 now abandoned.

DETAILED DESCRIPTION

The present invention relates to condensed isoindolone derivatives as well as their pharmaceutically acceptable acid addition salts, certain quaternary salts and N-oxides. These compounds have valuable pharmacological properties, in particular anti-inflammatory, spasmolytic and anti-tussive activities. The present invention relates also to pharmaceutical compositions containing these compounds and to methods of treating inflammatory diseases, spasms and tussive irritiations in mammals.

More particular, the present invention concerns compounds of the Formula I

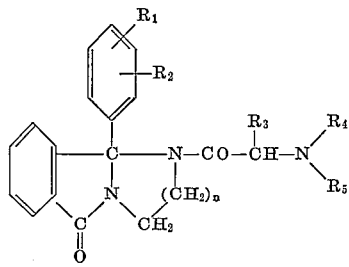

(I)

wherein $R_1$ and $R_2$ each independently are hydrogen, lower alkyl, lower alkoxy, or halogen;
$R_3$ is hydrogen or lower alkyl;
$R_4$ and $R_5$ each independently are lower alkyl, hydroxy-lower alkyl, or benzyl one of which can be substituted in the phenyl nucleus by at most two identical or differing groups selected from among lower alkyl, lower alkoxy, hydroxy and halogen, or both substituents together can be methylene-dioxy; or
$R_4$ and $R_5$ together with the nitrogen atom are piperidino, 1-pyrrolidino, morpholino, 4-methyl-1-piperazino, tetrahydro-isoquinolino, tetrahydroisoindolino, and
$n$ is an integer of from 1 to 3;

and the pharmaceutically acceptable acid addition salts, certain quaternary salts an the N-oxides thereof.

These compounds have been found to have a variety of valuable pharmacological properties. In particular, they exhibit anti-inflammatory, spasmolytic and anti-tussive properties in mammals on oral, rectal or, in form of aqueous solutions, also on parenteral administration. They are, therefore, useful for the treatment of rheumatic and other inflammatory diseases, for the amelioration and relief of spasms and tussive irritations. In addition some compounds of the invention exhibit also analgesic and hypotensive properties.

By the term lower alkyl and derivations thereof using the root "alk," namely hydroxy lower alkyl and lower alkoxy, is intended a group comprising a straight or branched hydrocarbon chain containing from one to four carbon atoms. Representative of lower alkyl groups are thus methyl, ethyl, n-propyl, isopropyl, n-butyl, isobutyl and tert. butyl. Representative of hydroxyloweralkyl are 2-hydroxyethyl, 2-hydroxypropyl, 3-hydroxypropyl, 2-hydroxy-1-methylethyl, 2-hydroxybutyl, 3-hydroxybutyl, 4-hydroxybutyl, 2-hydroxy-1-methylpropyl and 3-hydroxy-1-methylpropyl. Representatives of lower alkoxy groups are methoxy, ethoxy, n-propoxy, isopropoxy, n-butoxy, isobutoxy an sec-butoxy, respectively.

$R_4$ or $R_5$ can be substituted benzyl group and as such can be the o-fluorobenzyl, m-fluorobenzyl, p-fluorobenzyl, m-chlorobenzyl, p-chlorobenzyl, m-methylbenzyl, p-propylbenzyl, p-methoxybenzyl, p-ethoxybenzyl, 3,4-dimethoxybenzyl, 3,4-methylenedioxybenzyl, m-hydroxybenzyl, 3-methoxy-4-hydroxybenzyl and the like.

A preferred group of compounds exhibiting especially antiinflammatory properties are those compounds of Formula I wherein both $R_4$ and $R_5$ are lower alkyl.

Another preferred group of compounds are those compounds of Formula I wherein $R_4$ is lower alkyl and $R_5$ is benzyl or benzyl substituted by lower alkyl, lower alkoxy, methylenedioxy or halogen. These compounds exhibit particularly good spasmolytic and anti-tussive properties.

The compounds of Formula I are produced by reacting a reactive ester of a compound of the formula

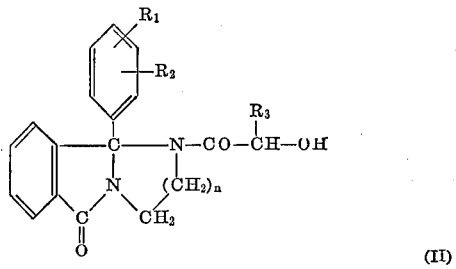

(II)

wherein $R_1$, $R_2$, $R_3$ and $n$ have the meanings as defined in Formula I, particularly a halide, an arene sulfonic acid ester or methane sulfonic acid ester, with a compound of the formula

(III)

wherein $R_4$ and $R_5$ independently of each other and also together with the adjacent nitrogen atom have the same meanings as defined in Formula I, the reaction being performed in the presence of an acid-binding agent. If desired, the compound obtained may be converted into a pharmaceutically acceptable acid addition or into a quaternary ammonium salt or into the N-oxide. The reactants are performed, for example, at room temperature or raised temperatures up to about 120° in suitable solvents or diluents such as excess amine, water, alkanols, dialkyl ethers, dioxane, tetrahydrofuran, benzene or toluene. Preferably an excess of amine of Formula III is used as acid binding agent, also, for example, a tertiary organic base such as triethylamine, dimethyl aniline or pyridine can be used.

The heterocyclic starting materials, i.e. the reactive esters of compounds of Formula II can be produced in their turn e.g. by reacting compounds of the formula

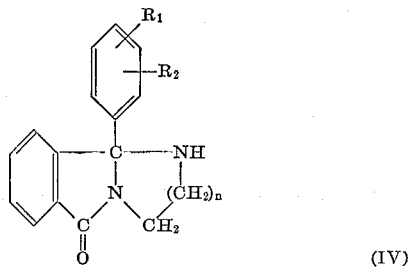

(IV)

wherein $R_1$, $R_2$ and $n$ have the meanings given in Formula I, with halides, particularly chlorides or bromides, or with anhydrides of lower α-halogen-, α-arene sulfonyloxy- or α-methane sulfonyloxy- alkanoic acids. The reactants are performed in the presence or absence of suitable solvents or diluents such as chlorobenzene or dimethyl formamide, while heating e.g. at the boiling temperature of the reaction mixture.

Compounds of Formula IV are prepared, for instance, by heating o-benzoylbenzoic acids of the formula

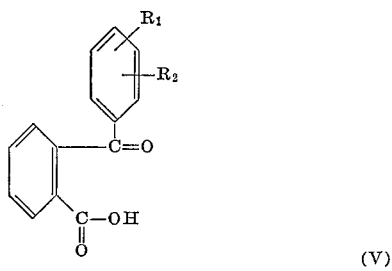

(V)

wherein $R_1$ and $R_2$ have the meanings as defined in Formula I, with alkylene diamines of the formula $$H_2N-CH_2-(CH_2)_n-NH_2 \qquad (VI)$$

wherein $n$ has the meaning as defined in Formula I, preferably at temperatures of 120 to 180°, in the presence or absence of organic solvents such as chlorobenzene, toluene, xylene and amyl alcohol.

The compounds of Formula I obtained according to the process of the invention are then, if desired, converted by conventional methods into their addition salts with inorganic and organic acids, into quaternary ammonium salts or into N-oxides.

To produce an acid addition salt, for example, the acid desired as salt component or a solution thereof is added to a solution of a compound of Formula I in an organic solvent. Preferably organic solvents in which the salt to be formed does not dissolve easily are chosen for the reaction, so that the salt can be isolated by filtration. Such solvents are e.g. ethanol, methanol/diethyl ether or ethanol/diethyl ether.

To produce quaternary salts, if desired, compounds of Formula I can be reacted with lower alkyl halides or benzyl halides, particularly iodides, bromides and chlorides, or with lower alkyl esters of sulfuric acid or of organic sulfonic acids, the reaction being performed with or without solvent. However, both quaternary salts and acid addition salts can be obtained in one step from a reactive ester of a compound of Formula II when said reactive ester is reacted with an amine of the formula

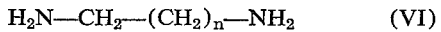

(IIIa)

wherein $R_4$ and $R_5$ have the meanings as defined in Formula I and $R_6$ represents hydrogen or a group as defined for $R_4$.

To produce N-oxides, the compounds of Formula I can be treated with an agent evolving oxygen, e.g. aqueous hydrogen peroxide. The oxidation is preferably performed in a solvent which is miscible with water and is sufficiently stable to the oxidising agent under the reaction conditions, e.g. ethanol.

For use in pharmaceutical compositions, instead of the free bases, the pharmaceutically acceptable acid addition salts can be used, i.e. salts with those acids the anions of which are pharmaceutically acceptable in the usual dosages. It is also of advantage if the salts to be used in pharmaceutical compositions crystallize well and are not or are only slightly hygroscopic. Hydrochloric acid, hydrobromic acid, sulfuric acid, phosphoric acid, methane sulfonic acid, ethane sulfonic acid, β-hydroxyethane sulfonic acid, acetic acid, malic acid, tartaric acid, citric acid, lactic acid, succinic acid, fumaric acid, maleic acid, benzoic acid, salicylic acid, phenylacetic acid, mandelic acid and embonic acid, for example, can be used for salt formation with compounds of Formula I.

Also suitable for use in pharmaceutical compositions are the quaternary salts, e.g. the methohalides and methosulfates, ethohalides and ethosulfates, propohalides and the butohalides, as well as the N-oxides of compounds of Formula I according to the invention.

As mentioned above, the compounds of the invention possess a variety of valuable pharmacological properties in mammals. These properties are demonstrated in standard pharmacological tests.

The anti-inflammatory activity is mainly demonstrated in rats in the Bolus alba Test according to G. Wilhelmi, Jap. Journ. Pharmac. 15, 190 (1965), and/or the Formalin Peritonitis Test according to G. Wilhelmi, Excerpta Med. Internal Congr. 82, 174 (1964). In these tests the reduction of swelling of the paws of the rats after administration of bolus alba, and the reduction of exudate formation after injection of a 1% formaldehyde solution, respectively, is a measure for anti-inflammatory activity of the compounds. Other anti-inflammatory tests in which the compounds of the invention show activity are the well known UV-erythema Test, the Dextrane Test, the Anti-Carragenin Test and the Protein Edema Test. Thus it is demonstrated that the following compounds on oral administration of between 100 and 400 mg./kg. of bodyweight have a significant anti-inflammatory activity:

1-(N,N-dimethylglycyl)-11b-phenyl-1,2,3,4,11b, hexahydro-7H-1,3-diazepino[2,1-a]isoindol-7-one;

1-(N,N-diethylglycyl)-9b-phenyl-1,2,3,9b, tetrahydro-5H-imidazo[2,1-a]isoindol-5-one hydrobromide;

1-[2-(methylethylamino)-butyryl]-9b-phenyl-1,2,3,9b-tetrahydro-5H-imidazo[2,1-a]isoindol-5-one;

1-[N,N-di-isopropylglycyl)-9b-phenyl-1,2,3,9b-tetrahydro-5H-imidazo[2,1-a]isoindol-5-one hydrochloride;

1-(N-methyl-N-ethylglycyl)-11b-phenyl-1,2,3,4,5-11b-hexahydro-7H-1,3-diazepino[2,1-a]isoindol-7-one;

1-(N,N-diethylglycyl)-11b-phenyl-1,2,3,4,5,11b-hexahydro-7H-1,3-diazepino[2,1-a]isoindol-7-one;

1-(N-ethyl-N-methylglycyl)-9b-phenyl-1,2,3,4,9b-tetrahydro-5H-imidazo[2,1-a]isoindol-5-one;

1-(N-ethyl-N-methylglycyl)-9b-(p-chlorophenyl)-1,2,3,9b-tetrahydro-5H-imidazo[2,1-a]isoindol-5-one hydrochloride; and 1-(N,N-diethylglycyl)-10b-phenyl-1,3,4,10b-tetrahydropyrimido[2,1-a]isoindol-6-2H-one.

The spasmolytic activity of the compounds of the invention is demonstrated on the isolated guinea pig ileum.

The compounds of the invention are found to be up to about tenfold more active than papaverine. The following compounds show particular good activity:

1-(N-propyl-N-benzylglycyl)-9b-phenyl-1,2,3,9b-tetrahydro-5H-imidazo[2,1-a]isoindol-5-one methanesulfonate;
1-(N-ethyl-N-(p-chlorobenzylglycyl)-9b-phenyl-1,2,3,9b-tetrahydro-5H-imidazo[2,1-a]isoindol-5-one;
1-(N-methyl-N-benzylglycyl)-10b-phenyl-1,3,4,10b-tetrahydro-pyrimido[2,1-a]isoindol-6(2H)-one;
1-(N-ethyl-N-benzylglycyl)-9b-phenyl-1,2,3,9b-tetrahydro-5H-imidazo[2,1-a]isoindol-5-one;
1-(N-ethyl-N-benzylglycyl)-9b-(p-chlorophenyl)-1,2,3,9b-tetrahydro-5H-imidazo[2,1-a]isoindol-5-one;
1-[N-methyl-N-(p-chlorobenzyl)-glycyl]-9b-phenyl-1,2,3,9b-tetrahydro-5H-imidazo[2,1-a]isoindol-5-one
1-[N-methyl-N-(p-methoxybenzyl-glycyl]-9b-(p-methoxyphenyl)-1,2,3,9b-tetrahydro-5H-imidazo[2,1-a]isoindol-5-one;
1-[N-ethyl-N-(p-methoxybenzyl)-glycyl]-9b-(3,4-dimethoxyphenyl)-1,2,3,9b-tetrahydro-5H-imidazo-[2,1-a]isoindol-5-one hydrochloride;
1-[N-propyl-N-(p-methoxybenzyl)-glycyl]-9b-phenyl-1,2,3,9b-tetrahydro-5H-imidazo[2,1-a]isoindol-5-one hydrochloride;
1-[N-butyl-N-benzylglycyl]-9b-phenyl-1,2,3,9b-tetrahydro-5H-imidazo[2,1-a]isoindol-5-one;
1-[N-butyl-N-(p-methoxybenzyl)-glycyl]-9b-phenyl-1,2,3,9b-tetrahydro-5H-imidazo[2,1-a]isoindol-5-one hydrochloride; .
1-(N-methyl-N-benzylglycyl)-10b-phenyl-1,3,4,10b-tetrahydro-pyrimido[2,1-a]isoindol-6(2H)-one;
1-(N-methyl-N-ethylglycyl)-11b-phenyl-1,2,3,4,5,11b-hexahydro-7H-1,3-diazepino[2,1-a]isoindol-7-one;
1-(N,N-diethylglycyl)-11b-phenyl-1,2,3,4,5,11b-hexahydro-7H-1,3-diazepino[2,1-a]isoindol-7-one; and
1-(N-ethyl-N-benzylglycyl)-11b-phenyl-1,2,3,4,5,11b-hexahydro-7H-1,3-diazepino[2,1-a]isoindol-7-one;

The antitussive activity of the compounds of the invention is demonstrated in cats according to the method of R. Domenjoz, Arch. exper. Path. und Pharmakol. 215, 19–24 (1952). On intravenous administration of about 0.1 to about 5 mg./kg. of bodyweight the following compounds are found to be active:

1-(N-propyl-N-benzylglycyl)-9b-phenyl-1,2,3,9b-tetrahydro-5H-imidazo[2,1-a]isoindol-5-one methanesulfonate;
1-(N-ethyl-N-(p-chlorobenzyl)-9b-phenyl-1,2,3,9b-tetrahydro-5H-imidazo[2,1-a]isoindol-5-one methanesulfonate;
1-[N-ethyl-N-(p-methoxyphenyl)-glycyl]-9b-phenyl-1,2,3,9b-tetrahydro-5H-imidazo[2,1-a]isoindol-5-one; and
1-[N-butyl-N-(p-methoxyphenyl)-glycyl]-9b-phenyl-1,2,3,9b-tetrahydro-5H-imidazo[2,1-a]isoindol-5-one.

1 - (piperidinoacetyl) - 10b - phenyl - 1,3,4,10b - tetrahydro - pyrimido[2,1-a]isoindol - 6(2H) - one demonstrated a marked and prolonged hypotensive action in does of 1.0–3.0 mg./kg., in anesthesized cats on intravenous administration. No undesirable side-effects were seen at these dose levels.

A very good analgesic effect was noted when an oral dose of 100 mg./kg. to 200 mg./kg. of 1-(N,N-dimethylglycyl) - 11b - phenyl - 1,2,3,4,5,11b - hexahydro - 7H - 1,3-diazepino[2,1-a]isoindol-7-one was administered to 20 mice in the hot plate test.

Illustratively, the acute toxicity was determined for 1-(N,N - diethylglycyl) - 9b - phenyl - 1,2,3,9b - tetrahydro - 5H-imidazo-[2,1-a]isoindol-5-one hydrobromide. The $LD_{50}$ on oral administration to mice was higher than 600 mg./kg. on intravenous administration to mice higher than 60 mg./kg.

For their intended use the compounds of the invention are administered in amounts depending on the species, age and weight of the subject under treatment as well as on the particular condition to be treated and the mode of administration. In general the daily dosages vary between about 0.15 and about 15 mg./kg. of bodyweight.

Suitable dosage units such as dragees (sugar-coated tablets), tablets, suppositories or ampoules, preferably contain 10 to 200 mg. of an active substance according to the invention. Also corresponding amounts of forms not made up into single dosages such as syrups, can be administered.

Dosage units for oral administration preferably contain between 1 to 90% of a compound of Formula I, a non-toxic acid addition salt, quaternary salt or N-oxide thereof as active substance. Tablets or dragée cores are produced e.g. by combining the active substance with solid, pulverulent carriers such as lactose, saccharose, soribtol, mannitol; starches such as potato starch, maize starch or amylopectin, laminaria powder; citrus pulp powder; cellulose derivatives or gelatin, optionally with the addition of lubricants such as magnesium or calcium stearate or polyethylene glycols (carbowaxes) of suitable molecular weights and pressing the mixtures into the desired form. The dragée cores are coated e.g. with concentrated sugar solutions which can also contain e.g. gum arabic, talcum and/or titanium dioxide, or with a lacquer dissolved in easily volatile organic solvents or mixtures of solvents. Dyestuffs can be added to these coatings e.g. to distinguish between varying dosages of active substances.

Dosage units for rectal administration are e.g. suppositories which consist of a combination of an active substance or a suitable salt thereof with a neutral fatty foundation, or also gelatine rectal capsules which contain a combination of the active substance or a suitable salt thereof with polyethylene glycols (carbowaxes) of suitable molecular weight.

Ampoules for parenteral, particularly intramuscular, administration preferably contain a water soluble salt of an active substance in a concentration of, preferably, 0.5–5%, in aqueous solution, optionally together with suitable stabilising agents and buffer substances.

The following examples further illustrate the production of the compounds of the invention, of hitherto undescribed intermediates, as well as the production of tablets and dragées, but they should not be construed as a limitation on the scope of the invention.

EXAMPLE 1

32.7 g. of 1-chloracetyl-9b-phenyl-1,2,3,9b-tetrahydro-5H-imidazo[2.1-a]isoindol-5-one (see below) are slurried in 20 ml. of dioxane and 33 g. of a 41% aqueous solution of dimethylamine are added whereupon the temperature rises from about 20° to 40° C. Whilst the starting material dissolves, two liquid phases are formed. The mixture is stirred for 15 minutes after which steam is bubbled through until the smell of the amine has disappeared. On cooling, 1-(N,N-dimethylglycyl)-9b-phenyl-1,2,3,9b-tetrahydro-5H-imidazo[2.1-a]isoindol-5-one crystallizes. The precipitate is filtered off under suction at 20°. After recrystallizing once from a mixture of 150 ml. of water and 150 ml. of methanol, the obtained compound melts at 147–150°.

1 - (N - ethyl - N - methylglycyl) - 9b - phenyl - 1,2,3,9b - tetrahydro - 5H - imidazo[2.1-a]isoindol - 5 - one, M.P. 120–123°, is produced analogously.

The 1-chloracetyl compound necessary in the above example is produced, for example, as follows:

22.6 g. of o-benzoyl benzoic acid are added to 7.2 g. of ethylenediamine and the mixture is gradualy heated to 140°, the excess ethylenediamine and the water liberated in the reaction being distilled off. After stirring for 2 hours at 140°, the melt is allowed to cool and is crystallized by the addition of a small amount of benzene. After recrystallization from benzene, the pure 9b-phenyl-1,2,3,9b - tetrahydro - 5H - imidazo[2.1-a]isoindol - 5 - one is obtained, M.P. 150–151°.

25 g. of this product and 34.2 g. of chloracetic acid anhydlride in 100 ml. of chlorobenzene are refluxed for 30 minutes. After concentrating in vacuo, the residue is recrystallized from ethyl acetate whereupon 1-chloracetyl-9b - phenyl - 1,2,3,9b - tetrahydro - 5H - imidazo[2.1-a]isoindol-5-one is obtained, M.P. 156–158°.

The structural formula of the first end product of Example 1 is:

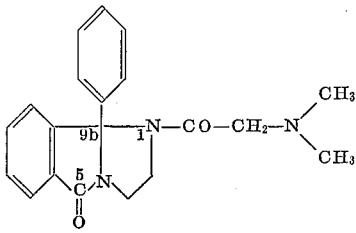

EXAMPLE 2

32.7 g. of 1-chloracetyl-9b-phenyl-1,2,3,9b-tetrahydro-5H-imidazo[2.1-a]isoindol-5-one (cf. Example 1, last paragraph) and 22 g. of diethylamine (100%) are refluxed for 1 hour in 50 ml. of dioxane. The diethylammonium chloride partially crystallizes. Steam is bubbled through until the excess amine and the dioxane have been removed; the crude product remains as a resin. After cooling, sodium hydroxide solution is added until the reaction is phenolphthalein alkaline and the reaction product is dissolved by shaking in 100 ml. of ether. The ethereal solution is extracted at about 30° with 30 ml. of 2 N hydrobromic acid and the acid solution is washed with 30 ml. of fresh ether. On cooling to about 5°, 1-(N,N-diethylglycyl)-9b-phenyl-1,2,3,9b-tetrahydro-5H-imidazo[2.1-a]-isoindol-5-one hydrobromide crystallizes. It is dissolved in 100 ml. of anhydrous ethanol and again precipitated by the addition of ether. In this way, the pure hydrobromide is obtained, which melts at 225–229° (with decomposition).

The following compounds are produced analogously:

(a) 1-(N,N-dipropylglycyl) - 9b - phenyl-1,2,3,9b-tetrahydro-5H-imidazo[2.1-a]isoindol-5-one hydrochloride, M.P. 227–230°.

(b) 1-(N-methyl-N-butylglycyl) - 9b - phenyl-1,2,3,9b-tetrahydro - 5H - imidazo[2.1-a]isoindol-5-one hydrochloride, M.P. 204–206°, (c) 1-(N,N-dibutylglycyl)-9b-phenyl - 1,2,3,9b - tetrahydro-5H-imidazo[2.1 - a]isoindol-5-one hydrochloride, M.P. 206–209°, (d) 1-(N,N-di-isopropylglycyl) - 9b - phenyl-1,2,3,9b-tetrahydro - 5H - imidazo[2.1-a]isoindol-5-one hydrochloride, M.P. 263–265° (with decomposition).

EXAMPLE 3

32.7 g. of 1-chloracetyl-9b-phenyl-1,2,3,9b-tetrahydro-5H-imidazo[2.1-a]isoindol-5-one (cf. Example 1, last paragraph) are slurried in 50 ml. of dioxane and 25.4 g. of piperidine are added. An exothermic reaction causes the temperature to rise to about 75°. The whole is kept for 10 minutes at 85–90°, then cooled and 200 ml. of water are added. The crude product precipitates as a resin-like mass. This is kneaded with a large amount of water and finally dissolved in dilute hydrochloric acid. The pH of the solution is adjusted to 4 and it is brought to a volume of 2 litres. On adding dilute sodium hydroxide solution dropwise, the free base again crystallizes. It is again dissolved in about 90 ml. of 1 N hydrochloric acid and the pH of the solution is adjusted to 4. After some time, the hydrochloride of 1-(piperidinoacetyl)-9b-phenyl-1,2,3,9b-tetrahydro - 5H - imidazo[2.1-a]isoindol-5-one precipitates in crystalline form. The pure hydrochloride is obtained by filtration under suction and recrystallization from ethanol and ether. The obtained product melts at 240–250° (with decomposition). The free base melts at 96–99°.

1-(morpholinoacetyl)-9b-phenyl-1,2,3,9b - tetrahydro-5H-imidazo[2.1-a]isoindol-5-one is produced analogously, M.P. 86–89° (from methanol).

EXAMPLE 4

34.1 g. of 1-chloracetyl-10b-phenyl-1,3,4,10b-tetrahydro-pyrimido[2.1-a]isoindol-6(2H)-one (see below) are slurried in 50 ml. of dioxane and 33 g. of a 41% aqueous solution of dimethylamine are added whereupon the temperature rises from about 20° to 40° and two phases are formed. The mixture is heated to 85–90° and then steam is bubbled through until all the dimethylamine has been removed. On cooling, the 1-(N,N-dimethylglycyl)-10b-phenyl - 1,3,4,10b - tetrahydro-pyrimido[2.1-a]isoindol-6(2H)-one crystallizes and is filtered off under suction at 20°.

The pure base, which melts at 172–175°, is obtained after recrystallizing once from a mixture of methanol/water.

The following compounds are obtained analogously:

(a) 1-(morpholinoacetyl) - 10b - phenyl-1,3,4,10b-tetrahydro-pyrimido[2,1-a]isoindol-6(2H)-one, M.P. 169–172° (from methanol/water);

(b) 1 - (piperindinoacetyl)-10b-phenyl-1,3,4,10b-tetrahydro-pyrimido[2.1-a]isoindol - 6(2H)-one, M.P. 182–185°;

(c) 1 - (N,N-diethylglycyl)-10b-phenyl-1,3,4,10b-tetrahydro-pyrimido[2.1-a]isoindol-6(2H)-one, M.P. 101–104°;

(d) 1-(N-methyl-N-ethylgylcyl)-10b-(p-methoxyphenyl)-1,3,4,10b-tetrahydro-pyramido[2.1 - a]isoindol-6(2H)-one, M.P. 120–123°;

(e) 1-(N,N-dimethylgylcyl) - 10b - (p-methoxyphenyl)-1,3,4,10b-tetrahydro-pyrimido[2.1 - a]isoindol-6(2H)-one, M.P. 155–157°;

(f) 1-(N,N-diethylgylcyl) - 10b - (p-methoxyphenyl)-1,3,4,10b-tetrahydro-pyrimido[2.1 - a]isoindol-6(2H)-one, M.P. 122–124°.

The chloracetyl compounds required for the production of the above end products are obtained, e.g. as follows:

22.6 g. of o-benzoyl benzoic acid and 8.9 g. of 1,3-propanediamine are heated within 1 hour to 140° and then for 1 hour at this temperature. After cooling, the crude product is recrystallized from about 300 ml. of ethyl acetate. In this way, 10b-phenyl-1,3,4,10b-tetrahydro-pyrimido[2.1-a]isoindol-6(2H)-one is obtained, M.P. 176–177°.

26.4 g. of this compound, 100 ml. of dimethyl formamide and 34.2 g. of chloracetic acid anhydride are heated for 30 minutes at 90–95°. A large amount of water is then added to the solution and the amorphous, crude product is dissolved in benzene. This solution is dried with sodium sulfate and concentrated in vacuo. The residue is recrystallized from a mixture of about 40 ml. of methanol and about 40 ml. of cyclohexane. 1-chloracetyl-10b-phenyl - 1,3,4,10b - tetrahydro-pyrimido[2.1-a]isoindol-6(2H)-one, M.P. 157°, is obtained.

In an analogous way, on using o-(p-anisoyl)-benzoic acid, 10b-(p-methoxyphenyl) - 1,3,4,10b - tetrahydro-pyrimido[2.1-a]isoindol-6(2H)-one, M.P. 162–163°, is obtained and, from this, 1-chloracetyl-10b-(p-methoxyphenyl) - 1,3,4,10b - tetrahydro-pyrimido[2.1-a]isoindol-6(2H)-one, M.P. 135–138°, is obtained.

The structural formula of the first end product of example 4 is:

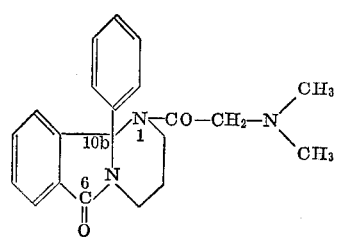

EXAMPLE 5

34.1 g. of 1-chloroacetyl-10b-phenyl-1,3,4,10b - tetrahydro - pyrimido[2.1-a]isoindol - 6(2H) - one (cm. Example 4, penultimate paragraph) are slurried in 70 ml. of dioxane and 30.0 g. of 1-methyl-piperazine are added. The mixture is heated within 30 minutes to 95–100° and kept at this temperature for 15 minutes. Sodium hydroxide solution is then added to the solution and the smeary product which separates is dissolved, after cooling, by repeated extraction with ether. The ether solutions are dried with sodium sulfate and then concentrated.

The glassy crude product is recrystallized from about 1500 ml. of methylcyclohexane. 1 - [(4-methyl-1-piperazinyl)-acetyl] - 10b - phenyl - 1,3,4,10b-tetrahydro-pyrimido[2.1-a]isoindol - 6(2H) - one is obtained, M.P. 135–137°.

EXAMPLE 6

35.5 g. of 1 - chloroacetyl - 11b-phenyl-1,2,3,4,5,11b-hexahydro - 7H - 1,3-diazepino[2.1-a]isoindol-7-one are slurried in 40 ml. of dioxane and 33 g. of a 41% aqueous solution of dimethylamine are added. The whole is heated within 30 minutes to 90° and steam is bubbled through the solution until all the dimethylamine has been removed. The product, which is at first smeary, crystallizes on cooling. It is filtered and recrystallized, first from methanol, then from ethyl acetate. 1 - (N,N-dimethylglycyl) - 11b-phenyl - 1,2,3,4,5,11b - hexahydro - 7H - 1,3-diazepino[2.1-a]isoindol-7-one is obtained, M.P. 205–207°.

The following compounds are obtained analogously:

(a) 1 - (morpholinoacetyl) - 11b - phenyl - 1,2,3,4,5,11b-hexahydro - 7H - 1,3 - diazepino[2.1-a]isoindol-7-one, M.P. 220–223° (from methanol);

(b) 1 - (piperidinoacetyl) - 11b - phenyl - 1,2,3,4,5,11b-hexahydro - 7H - 1,3 - diazepino[2.1-a]isoindol-7-one, M.P. 211–213° (from methanol);

(c) 1 - (N,N - diethylglycyl) - 11b - phenyl - 1,2,3,4,5, 11b - hexahydro - 7H - 1,3-diazepino[2.1-a]isoindol-7-one, M.P. 135–141°;

(d) 1 - (N - methyl - N - ethylglycyl)-11b - phenyl - 1,2, 3,4,5,11b - hexahydro - 7H - 1,3-diazepino[2.1-a]isoindol-7-one, M.P. 160–165°;

(e) 1 - (N - ethyl - N - benzylglycyl) - 11b-phenyl-1,2,3, 4,5,11b-hexahydro - 7H - 1,3-diazepino[2.1-a]isoindol-7-one, M.P. 136–138°.

To produce the 1-chloracetyl compound of this example, 22.6 g. of o-benzoyl benzoic acid and 10.1 g. of 1,4-butanediamine are heated within 2 hours to 179° with 100 g. of o-dichlorobenzene, the reaction water being distilled off with a small amount of o-dichlorobenzene. After concentrating in vacuo, the crystalline residue is recrystallized from benzene. Pure 11b-phenyl-1,2,3,4, 5,11b - hexahydro-7H - 1,3 - diazepino[2.1-a]isoindol-7-one is obtained, M.P. 180–181°.

27.8 g. of this compound and 34.2 g. of chloracetic acid anhydride in 100 ml. of dimethyl formamide are heated for 30 minutes at 90–95°. The solution is then poured into 1000 ml. of water and the partially crystallized product is filtered under suction and recrystallized from methanol. 1 - chloracetyl - 11b - phenyl - 1,2,3,4, 5,11b - hexahydro - 7H - 1,3-diazepino[2.1-a]isoindol-7-one is obtained, M.P. 203–207°.

The structural formula of the first end product of Example 6 is:

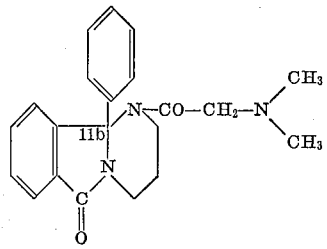

EXAMPLE 7

39.9 g. of 1-(2 - bromobutyryl) - 9b - phenyl-1,2,3,9b-tetrahydro - 5H - imidazo[2.1-a]isoindol-5-one (see below) are slurried in 50 ml. of dioxane and 34 g. of a 41% aqueous solution of dimethylamine are added. The mixture is refluxed for 15 minutes and then excess dimethylamine is removed with steam. The amorphous crude product is crystallized by the addition of a small amount of methanol and then recrystallized from dilute methanol. 1 - [2 - (dimethylamino) - butyryl]-9b-phenyl-1,2,3,9b-tetrahydro - 5H - imidazo[2.1-a]isoindol - 5-one is obtained, M.P. 142–144.5°.

The following compounds are obtained analogously:

(a) 1 - [2 - (methylethylamino)-butyryl]-9b-phenyl-1,2, 3,9b - tetrahydro - 5H - imidazo[2.1-a]isoindol-5-one, M.P. 108–112°, and (b) 1 - (2 - morpholinobutyryl) - 9b - phenyl - 1,2,3,9b-tetrahydro - 5H - imidazo[2.1-a]isoindol - 5 - one, M.P. 120–122°.

To produce the 1-(2-bromobutryl) compound, 25 g. of 9b - phenyl - 1,2,3,9b - tetrahydro - 5H - imidazo[2.1-a] isoindol-5-one (cf. last paragraph of Example 1) and 18.5 g. of 2-bromobutyryl chloride in 100 ml. of chlorobenzene are refluxed for 1 hour. The reaction solution is washed several times with water, dried with sodium sulfate and concentrated in vacuo. The residue is recrystallized twice from methanol. 1-(2-bromobutyryl)-9b-phenyl-1,2,3,9b - tetrahydro - 5H - imidazo[2.1-a]isoindol-5-one is obtained, M.P. 161–164°.

EXAMPLE 8

39.9 g. of 1 - (2 - bromobutyryl) - 9b - phenyl - 1,2,3, 9b - tetrahydro - 5H - imidazo[2.1-a]isoindol-5-one (see Example 7, last paragraph) are slurried in 65 ml. of dioxane and, with 22 g. of diethylamine, refluxed for 1 hour. The solution is poured into 500 ml. of water and the amorphous crude product is dissolved in ether. The ethereal solution is concentrated to about 50 ml. and then allowed to stand whereupon a small amount of 1-crotonyl-9b-phenyl-1,2,3,9b - tetrahydro - 5H - imidazo[2.1-a]isoindol-5-one precipitates as side product.

The filtered ether solution is concentrated, the residue is dissolved in 2H hydrobromic acid and the solution is cooled to 0°. The hydrobromide of 1-(2-diethylaminobutyryl)-9b - phenyl - 1,2,3,9b - tetrahydro - 5H - imidazo[2.1-a]isoindol - 5 - one crystallizes. After recrystallization from ethanol/ether, the pure hydrobromide is obtained, M.P. 223–225° (with decomposition).

EXAMPLE 9

38.5 g. of 1-(2-bromopropionyl)-9b-phenyl-1,2,3,9b-tetrahydro-5H-imidazo[2.1-a]isoindol-5-one (M.P. 157–159°, produced analogously to the process described in the last paragraph of Example 7), are slurried in 50 ml. of dioxane and 34 g. of a 41% aqueous solution of dimethylamine are added. The mixture is refluxed for 20 minutes, after cooling, it is diluted with 500 ml. of ether, washed with water, the washing water is removed, the mixture is dried with sodium sulphate and concentrated in vacuo. On triturating with fresh ether, the crude product crystallizes. After recrystallization from a mixture of ethyl acetate and hexane, 1-(N,N-dimethylalanyl)-9b-phenyl - 1,2,3,9b - tetrahydro-5H-imidazo[2.1-a]isoindol-5-one is obtained, M.P. 139–141°.

The following compounds are produced analogously:

(a) 1-(N-methyl-N-ethylalanyl)-9b-phenyl-1,2,3,9b-tetrahydro - 5H - imidazo[2.1-a]isoindol-5-one, M.P. 150–153°;

(b) 1-(N,N-diethylalanyl)-9b-phenyl-1,2,3,9b-tetrahydro-5H-imidazo[2.1-a]isoindol-5-one hydrochloride, M.P. 205–215° (with decomposition).

EXAMPLE 10

36.1 g. of 1-chloracetyl-9b-(p-chlorophenyl)-1,2,3,9b-tetrahydro-5H-imidazo[2.1-a]isoindol-5-one (M.P. 163–165.5°, see below) are slurried in 40 ml. of dioxane and, after the addition of 34 g. of a 41% aqueous dimethylamine solution, refluxed for 15 minutes. After cooling, it is diluted with ether and washed with water. The ether solution is dried with sodium sulfate and concentrated in vacuo. The honey-like crude product obtained is dissolved in anhydrous ether and converted into the hydrochloride by the introduction of hydrogen chloride. This is recrystallized from a mixture of ethanol and ether. 1-(N,N - dimethylglycyl) - 9b - (p-chlorophenyl)-1,2,3,9b-tetrahydro - 5H-imidazo[2.1-a]isoindol-5-one hydrochloride is obtained. It decomposes at about 255°.

The following compounds are produced analogously:

(a) 1-(N,N-diethylglycyl)-9b-(p-chlorophenyl)-1,2,3,9b-tetrahydro - 5H - imidazo[2.1-a]isoindol-5-one hydrochloride, M.P. 225–232° (with decomposition);
(b) 1 - (N - methyl-N-ethylglycyl)-9b-(p-chlorophenyl)-1,2,3,9b - tetrahydro - 5H-imidazo[2.1-a]isoindol-5-one hydrochloride, M.P. 213–220° (with decomposition).

The 1-chloracetyl compound necessary for this example is produced analogously to the process described in the last paragraph of Example 1, starting from o-(p-chlorobenzoyl)-benzoic acid, by way of 9b-(p-chlorophenyl)-1,2,3,9b - tetrahydro - 5H - imidazo[2.1-a]isoindol-5-one, M.P. 166–168°.

EXAMPLE 11

35.6 g. of 1-chloracetyl-9b-(p-methoxyphenyl)-1,2,3,9b-tetrahydro - 5H-imidazo[2.1-a]isoindol-5-one (does not crystallize, see below), 40 ml. of dioxane and 34 g. of a 41% aqueous dimethylamine solution are refluxed for 15 minutes. After cooling, the reaction solution is diluted with ether, washed with water and evaporated to dryness. The honey-like residue is dissolved in 500 ml. of anhydrous ether. Hydrogen chloride is then introduced until saturation. The hydrochloride of 1-(N,N-dimethylglycyl)-9b - (p - methoxyphenyl)-1,2,3,9b-tetrahydro-5H-imidazo-[2.1-a]isoindol-5-one immediately crystallizes. It is recrystallized from a mixture of ethanol and ether, M.P. 240–243° (with decomposition).

The following compounds are produced analogously:

(a) 1-(N-methyl-N-ethylglycyl)-9b-(p-methoxyphenyl)-1,2,3,9b - tetrahydro - 5H-imidazo[2.1-a]isoindol-5-one hydrochloride, M.P. 225–228° (with decomposition);
(b) 1-(N,N-diethylglycyl)-9b-(p-methoxyphenyl)-1,2,3,9b-tetrahydro-5H-imidazo[2.1-a]isoindol-5-one hydrochloride, M.P. 210–220° (with decomposition);
(c) 1-(N,N-dimethylglycyl)-9b-(p-ethoxyphenyl)-1,2,3,9b-tetrahydro-5H-imidazo[2.1-a]isoindol-5-one hydrochloride, M.P. 225–230° (with decomposition);
(d) 1 - (N - methyl-N-ethylglycyl)-9b-(p-ethoxyphenyl)-1,2,3,9b - tetrahydro - 5H-imidazo[2.1-a]isoindol-5-one hydrochloride, M.P. 230° (with decomposition);
(e) 1-(N,N-diethylglycyl)-9b-(p-ethoxyphenyl)-1,2,3,9b-tetrahydro-5H-imidazo[2.1-a]isoindol-5-one hydrochloride, M.P. 220° (with decomposition).

The starting materials for the production of the above compounds are obtained analogously to the scheme of reactions described in the last paragraph of Example 1. Starting from o-(p-anisoyl)-benzoic acid and ethylene diamine, the reaction proceeds by way of 9b-(p-methoxyphenyl) - 1,2,3,9b-tetrahydro-5H-imidazo[2.1-a]isoindol-5-one (M.P. 160–161°), and starting from o-(p-ethoxybenzoyl)-benzoic acid and ethylene-diamine, it proceeds by way of 9b-(p-ethoxyphenyl)-1,2,3,9b-tetrahydro-5H-imidazo[2.1-a]isoindol-5-one (M.P. 158–159°). The 1-chloroacetyl - 9b - (p-ethoxyphenyl)-1,2,3,9b-tetrahydro-5H-imidazo[2.1-a]isoindol-5-one, as immediate starting material for the compounds mentioned under (c), (d) and (e), melts at 132–135°.

EXAMPLE 12

35.5 g. of 1-chloracetyl-9b-(3,4-xylyl)-1,2,3,9b-tetrahydro-5H-imidazo[2.1-a]isoindol-5-one (it does not crystallize, see below) are dissolved in 40 ml. of dioxane and, after the addition of a 41% aqueous solution of dimethylamine, the mixture is refluxed for 15 minutes. After cooling, the reaction mixture is diluted with 100 ml. ether and the solution is washed with water. 1-(N,N-dimethylglycyl) - 9b - (3,4-xylyl)-1,2,3,9b-tetrahydro-5H-imidazo-[2.1-a]isoindol-5-one crystallize out, M.P. 157–160° from ethanol.

The following compounds are produced analogously:

(a) 1 - (N - methyl-N-ethylglycyl)-9b-(3,4-xylyl-1,2,3,9b-tetrahydro - 5H - imidazo[2.1-a]isoindol-5-one hydrochloride, M.P. 230–235° (with decomposition), and
(b) 1 - (N,N-diethylglycyl)-9b-(3,4-xylyl)-1,2,3,9b-tetrahydro-5H-imidazo[2.1-a]isoindol-5-one hydrochloride, M.P. 230–235° (with decomposition).

The 1-chloracetyl compound required as starting material is produced analogously to the scheme of reactions described in Example 1, starting from o-(3,4-xylyl)-benzoic acid and ethylenedimaine by way of 9b-(3,4 xylyl) - 1,2,3,9b-tetrahydro-5H-imidazo[2.1-a]isoindol-5-one, M.P. 149–152°.

EXAMPLE 13

34.1 g. of 1-chloracetyl-10b-phenyl-1,3,4,10b-tetrahydropyrimido[2,1-a]isoindol-6(2H)-one (cf. Example 4, last paragraph) are dissolved in 25 ml. of dioxane and 22.5 g. of 2-methylamino-ethanol are added. The whole is heated for 15 minutes at 90–100° and then concentrated in vacuo. The amorphous residue is washed with water and dissolved in ethyl acetate. The solution is dried with sodium sulfate and concentrated. The crude product which slowly crystallizes is recrystallized first from ethyl acetate and then from a mixture of benzene/hexane. 1-[N-(2-hydroxyethyl)-N-methylglycyl]-10b-phenyl-1,3,4,10b - tetrahydro - pyrimido[2,1-a]isoindol-6(2H)-one is obtained, M.P. 114–117°.

EXAMPLE 14

32.7 g. of 1-chloroacetyl-9b-phenyl-1,2,3,9b-tetrahydro-5H-imidazo[2,1-a]isoindol-5-one (production see Example 1), 40.5 g. of N-ethyl-benzylamine and 40 ml. of dioxane are heated to 100°. After 15 minutes, the reaction mixture is allowed to cool and is then extracted with 20 ml. of water and 300 ml. of ether. On cencentrating the ether phase, 1-(N-ethyl-N-benzylglycyl)-9b-phenyl-1,2,3,9b-tetrahydro-5H-imidazo[2,1-a]isoindol-5 - one crystallizes. After recrystallization from ethyl acetate and hexane it melts at 126–128°.

The following compounds are produced analogously:

(a) 1-(N-methyl-N-benzylglycyl)-9b-phenyl-1,2,3,9b-tetrahydro-5H-imidazo[2,1-a]isoindol-5-one, M.P. 157–159°;
(b) 1-[N-ethyl-N-(p-chlorobenzyl)-glycyl]-9b-phenyl-1,2,3,9b-tetrahydro-5H-imidazo[2,1-a]isoindol-5-one; M.P. 104–106.5°;
(c) 1-[N-methyl-N-(p-chlorobenzyl)-glycyl]-9b-phenyl-1,2,3,9b-tetrahydro-5H-imidazo[2,1-a]isoindol-5-one, M.P. 112–115°;
(d) 1-[N-methyl-N-(p-methoxyphenyl)-glycyl]-9b-phenyl-1,2,3,9b-tetrahydro-5H-imidazo[2,1-a]isoindol-5-one, M.P. 117–120°;
(e) 1-[N-ethyl-N-(p-methoxyphenyl)-glycyl]-9b-phenyl-1,2,3,9b-tetrahydro-5H-imidazo[2,1-a]isoindol-5-one hydrochloride, M.P. 254° (with decomposition);
(f) 1-(N-propyl-N-benzylglycyl)-9b-phenyl-1,2,3,9b-tetrahydro-5H-imidazo[2,1-a]isoindol-5-one, M.P. 117–119°;
(g) 1-(N-ethyl-N-benzylglycyl)-9b-(p-chlorophenyl)-1,2,3,9b-tetrahydro-5H-imidazo[2,1-a]isoindol-5-one, M.P. 95–100°;

(h) 1-(N-methyl-N-benzylglycyl)-9b-(3,4-dimethoxyphenyl)-1,2,3,9b-tetrahydro-5H-imidazo[2,1-a]isoindol-5-one hydrochloride; M.P. 193–195° (with decomposition);

(i) 1-(N-ethyl-N-benzylglycyl)-9b-(3,4-dimethoxyphenyl)-1,2,3,9b-tetrahydro-5H-imidazo[2,1-a]isoindol-5-one hydrochloride; M.P. 223–225° (with decomposition);

(k) 1-[N-methyl-N-(p-methoxybenzyl)-glycyl]-9b-(3,4-dimethoxyphenyl)-1,2,3,9b-tetrahydro-5H-imidazo[2,1-a]isoindol-5-one hydrochloride; M.P. 218–220° (with decomposition);

(l) 1-[N-ethyl-N-(p-methoxybenzyl)-glycyl]-9b-(3,4-dimethoxyphenyl)-1,2,3,9b-tetrahydro-5H-imidazo[2,1-a]isoindol-5-one hydrochloride, M.P. 179–180°;

(m) 1-[N-methyl-N-(p-chlorobenzyl)-glycyl]-9b-(3,4-dimethoxyphenyl)-1,2,3,9b-tetrahydro-5H-imidazo[2,1-a]isoindol-5-one hydrochloride, M.P. 197–198°;

(n) 1-[N-ethyl-N-(3,4-dimethoxybenzyl)-glycyl]-9b-(3,4-dimethoxyphenyl)-1,2,3,9b-tetrahydro-5H-imidazo[2,1-a]isoindol-5-one hydrochloride;

(o) 1-(N-propyl-N-benzylglycyl)-9b-(3,4-dimethoxyphenyl)-1,2,3,9b-tetrahydro-5H-imidazo[2,1-a]isoindol-5-one hydrochloride, M.P. 230–232° (with decomposition);

(p) 1-[N-methyl-N-(3,4-dimethoxybenzyl)-glycyl]-9b-(3,4-dimethoxyphenyl)-1,2,3,9b-tetrahydro-5H-imidazo[2,1-a]isoindol-5-one hydrochloride;

(q) 1-[N-ethyl-N-(3,4-methylenedioxybenzyl)-glycyl]-9b-(3,4-dimethoxyphenyl)-1,2,3,9b-tetrahydro-5H-imidazo[2,1-a]isoindol-5-one hydrochloride;

(r) 1-(N-ethyl-N-benzylalanyl)-9b-phenyl-1,2,3,9b-tetrahydro-5H-imidazo[2,1-a]isoindol-5-one hydrochloride, M.P. 196–198°;

(s) 1-[N-ethyl-N-(3,4-dimethoxybenzyl)-glycyl]-9b-phenyl-1,2,3,9b-tetrahydro-5H-imidazo[2,1-a]isoindol-5-one;

(t) 1-[N-methyl-N-(p-methoxybenzyl)-glycyl]-9b-(p-methoxyphenyl)-1,2,3,9b-tetrahydro-5H-imidazo[2,1-a]isoindol-5-one, M.P. 130–131°;

(u) 1-[N-methyl-N-(3,4-methylenedioxybenzyl)-glycyl]-9b-(3,4-dimethoxyphenyl)-1,2,3,9b-tetrahydro-5H-imidazo[2,1-a]isoindol-5-one hydrochloride, M.P. 192–194°;

(v) 1-(N-butyl-N-benzylglycyl)-9b-phenyl-1,2,3,9b-tetrahydro-3H-imidazo[2,1-a]isoindol-5-one; M.P. 87–99°;

(w) 1-[N-propyl-N-(p-methoxybenzyl)-glycyl]-9b-phenyl-1,2,3,9b-tetrahydro-5H-imidazo[2,1-a]isoindol-5-one hydrochloride; M.P. 212°;

(x) 1-[N-butyl-N-(p-methoxybenzyl)-glycyl]-9b-phenyl-1,2,3,9b-tetrahydro-5H-imidazo[2,1-a]isoindol-5-one hydrochloride; M.P. 200–202°.

EXAMPLE 15

34.0 g. of 1-chloracetyl-10b-phenyl-1,3,4,10b-tetrahydropyrimido[2,1-a]isoindol-6(2H)-one (production see Example 4), are dissolved in 40 ml. of dioxane and the solution is heated for 10 minutes at 100° with 36.3 g. of N-methyl-benzylamine. After cooling, the reaction mixture is extracted with 20 ml. of water and 300 ml. of ether. On concentrating the ether phase, the 1-(N-methyl-N-benzylglycyl) - 10b - phenyl - 1,3,4,10b-tetrahydropyrimido[2.1-a]isoindol-6(2H)-one is isolated. Recrystallized from ethyl acetate and hexane, the obtained product melts at 126–127.5°.

1-(N-ethyl-N-benzylglycyl) - 10b - phenyl-1,3,4,10b-tetrahydro - pyrimido[2,1-a]isoindol-6(2H) - one, M.P. 141–144° is produced analogously.

EXAMPLE 16

(a) 33.5 g. of 1-(N,N-dimethylglycyl)-9b-phenyl-1,2,3,9b-tetrahydro-5H-imidazo[2,1-a]isoindol-5-one (produced according to Example 1) are dissolved in 500 ml. of ethyl acetate and 100 g. of methyl iodide are added at room temperature. The quaternary ammonium salt immedaitely precipitates in oily form and crystallizes on washing with hexane. M.P. 233° (with decomposition).

(b) The methochloride is obtained on reacting 32.7 g. of 1-chloracetyl-9b-phenyl-1,2,3,9b-tetrahydro-5H-imidazo[2,1-a]isoindol-5-one with a solution of 50 ml. of trimethylamine in 500 ml. of ether.

EXAMPLE 17

34.1 g. of 1-chloracetyl-10b-phenyl-1,3,4,10b-tetrahydropyrimido[2,1-a]isoindol-6(2H)-one are dissolved in 50 ml. of dioxane and the solution is heated for 1 hour at 90° with 36 g. of N-methyl-diethanolamine. After cooling, the crude product is precipitated with petroleum ether and recrystallized from alcohol. In this way 1-(N,N-bis-hydroxyethyl-glycyl) - 10b - phenyl-1,3,4,10b-tetrahydropyrimido[2,1-a]isoindol-6(2H)-one methochloride is obtained. Decomposition point: 200°.

EXAMPLE 18

36.3 g. of 1-(N,N-diethylglycyl)-9b-phenyl-1,2,3,9b-tetrahydro-5H-imidazo[2,1-a]isoindol-5-one (see Example 1) are dissolved in 250 ml. of ethanol and 12 ml. of a 28% aqueous solution of hydrogen peroxide are added. The mixture is refluxed for 2 hours. On carefully concentrating, the N-oxide crystallizes.

The following examples illustrates the production of tablets and dragées:

EXAMPLE 19

1000 g. of 1-(N,N-dimethylglycyl)-11b-phenyl-1,2,3,4,5,11b-hexahydro-7H-1,3-diazepino[2,1-a]isoindol - 7 - one are mixed with 351.60 g. of lactose and 339.40 g. of potato starch, the mixture is moistened with an alcoholic solution of 20 g. of stearic acid and granulated through a sieve. After drying, 320 g. of potato starch, 400 g. of talcum, 5.00 g. of magnesium stearate and 64 g. of colloidal silica are mixed in and the mixture is pressed into 10,000 tablets each weighing 250 mg. and containing 100 mg. of active substance. If desired, the tablets can be grooved for better adaptation of the dosage.

EXAMPLE 20

A granulate is produced from 250 g. of 1-(N-methyl-N-ethylglycyl)-1,2,3,9b-tetrahydro - 5H - imidazo[2,1-a]isoindol-5-one, 175.90 g. of lactose and the alcoholic solution of 10 g. of stearic acid. After drying, 56.60 g. of colloidal silica, 165 g. of talcum, 20 g. of potato starch and 2.50 g. of magnesium stearate are mixed in and the mixture is pressed into 10,000 dragée cores. These are then coated with a concentrated syrup made from 502.28 g. of crystallised saccharose, 6 g. of shellac, 10 g. of gum arabic, 0.22 g. of dyestuff and 1.5 g. of titanium dioxide and dried. The dragées obtained each weigh 120 mg. and contain 25 mg. of active substance.

What is claimed is:

1. A compound of the formula:

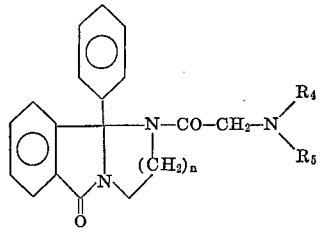

wherein $n$ is an integer from 1 to 3 and
 (a) each of $R_4$ and $R_5$ is lower alkyl,
 (b) $R_4$ is lower alkyl and $R_5$ is benzyl, chlorobenzyl or methoxybenzyl, or
 (c) $R_4$ and $R_5$ taken together with the nitrogen atom to which each is attached are piperidino or N-methylpiperazino, or a pharmaceutically acceptable acid addition salt thereof.

2. A compound according to claim 1 wherein each of $R_4$ and $R_5$ are lower alkyl.

3. The compound according to claim 2 which is 1 - (N,N-diethylglycyl)-9b-phenyl-1,2,3,9b-tetrahydro-5H-imidazo[2,1-a]isoindol-5-one.

4. The compound according to claim 2 which is 1-(N,N-dimethylglycyl) - 11b - phenyl-1,2,3,4,5,11b-hexahydro-7H-1,3-diazepino[2,3-a]isoindol-7-one.

5. A compound according to claim 1 wherein $R_4$ is lower alkyl and $R_5$ is benzyl, chlorobenzyl or methoxybenzyl.

6. The compound according to claim 5 which is 1-(N-ethyl-N-benzylglycyl) - 10b - phenyl-1,3,4,10b-tetrahydropyrimido[3,1-a]isoindol-6(2H)-one.

7. A compound according to claim 1 wherein $R_4$ and $R_5$ taken together with the nitrogen atom to which each is attached are piperidino or N-methylpiperazino.

8. The compound according to claim 7 which is 1 - (piperidinoacetyl) - 10b - phenyl-1,3,4,10b-tetrahydropyrimido[2,1-a]isoindol-6(2H)-one.

References Cited

FOREIGN PATENTS 6613264 3/1967 Netherlands.

ALEX MAZEL, Primary Examiner

R. J. GALLAGHER, Assistant Examiner

U.S. Cl. X.R.

260—251, 247.2, 256.4, 268, 287, 294, 309.7, 326.1; 424—200, 232, 248, 251, 256, 267, 273